United States Patent [19]
Sommer et al.

[11] 3,992,143
[45] Nov. 16, 1976

[54] EXHAUST PROCESS FOR THE DYEING OF SYNTHETIC FIBER MATERIALS

[75] Inventors: Richard Sommer, Leverkusen; Wolfgang Haebler, Odenthal, both of Germany

[73] Assignee: Bayer Aktiengesellschaft, Leverkusen, Germany

[22] Filed: June 20, 1974

[21] Appl. No.: 481,223

Related U.S. Application Data

[63] Continuation of Ser. No. 237,519, March 23, 1972, abandoned.

[30] Foreign Application Priority Data

Mar. 23, 1971 Germany............................ 2113836

[52] U.S. Cl............................................ 8/41 R; 8/82; 8/94 A; 8/162 R; 8/179
[51] Int. Cl.² ........................ D06P 1/02; D06P 3/12
[58] Field of Search..................... 8/41, 82, 94, 41 R

[56] References Cited

UNITED STATES PATENTS

| | | | |
|---|---|---|---|
| 3,510,243 | 5/1970 | Seuret et al................................ | 8/39 |
| 3,667,898 | 6/1972 | Bergman et al............................ | 8/94 |

FOREIGN PATENTS OR APPLICATIONS

| | | |
|---|---|---|
| 1,341,964 | 9/1963 | France |
| 1,192,984 | 5/1970 | United Kingdom |

OTHER PUBLICATIONS

Balmforth et al., J. Soc. Dyers and Colourists, 1966, 82 (11), pp. 405–409.
"Dyeing From Organic Solvents" in Farben Revue.

*Primary Examiner*—Joseph L. Schofer
*Assistant Examiner*—A. L. Clingman
*Attorney, Agent, or Firm*—Plumley & Tyner

[57] ABSTRACT

Exhaust process for the dyeing of synthetic fiber materials from organic water-immiscible solvents wherein are used as dyestuffs dis- and trisazo dyestuffs which contain at least 2 hydroxyl groups and which are free from sulfonic acid and carboxyl groups and which correspond to the formula

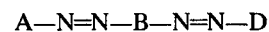

$$A\text{---}N\!=\!N\text{---}B\text{---}N\!=\!N\text{---}D$$

in which A, D and B have the meaning given below in the disclosure. By means of these dyestuffs there are obtained dyeings in excellent dyestuff yields and fastness properties.

11 Claims, No Drawings

EXHAUST PROCESS FOR THE DYEING OF SYNTHETIC FIBER MATERIALS

This is a continuation of application Ser. No. 237,519, filed Mar. 23, 1972, now abandoned.

The invention relates to an exhaust process for the dyeing of synthetic fibre materials from organic water-immiscible solvents; more particularly it concerns an exhaust process for the dyeing of synthetic fibre materials from organic water-immiscible solvents wherein are used as dyestuffs dis- and trisazo dyestuffs which contain at least 2 hydroxyl groups which are free from sulfonic acid and carboxyl groups and which correspond to the formula

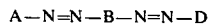

in which

A and D stand for the radical of a coupling component of the phenol or naphthol series which is free from sulphonic acid and carboxyl groups; and B means an optionally substituted phenylene or naphthylene radical or an optionally substituted bivalent radical consisting of two benzene or naphthalene rings which are linked to one another by a direct bond, a bivalent atom, a bivalent group, or by a direct bond and a bivalent atom or by a direct bond and a bivalent group, each of the benzene or naphthalene rings being linked to one of the two azo groups.

Organic water-immiscible solvents suitable for the process according to the invention are those the boiling point of which is comprised between 40° and 170° C, for example, aromatic hydrocarbons such as toluene, xylene: and halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 1,2-dichloropropane, 1,1,1-trichloropropane, 1-chlorobutane, 2-chlorobutane, 1,4-dichlorobutane, 1-chloro-2-methylpropane or 2-chloro-2-methyl-propane; as well as aliphatic fluorinated and fluorochlorinated hydrocarbons such as perfluoro-n-hexane, 1,2,3-trifluoro-trichloroethane and trifluoro-pentachloropropane; aromatic chlorinated and fluorinated hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly satisfactory. Mixtures of these solvents can also be used.

For B there are mentioned as optionally substituted phenylene, naphthylene or bivalent radicals consisting of two benzene or naphthalene rings residues of the formulae

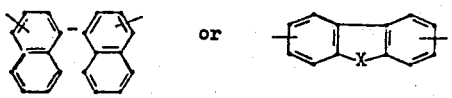

Substituents which may be present in the benzene or naphthalene rings are, for example, halogen atoms such as fluorine, chlorine or bromine; $C_1$–$C_4$-alkyl groups such as methyl or ethyl groups; or lower alkoxy groups such as methoxy or ethoxy.

In the formula Y represents a bivalent bridge atom or a divalent group, such as e.g. —O—, —S—, —NH—, —$SO_2$—, —CONH—, —NHCONH—, —$CH_2$—, —$CH_2$—$CH_2$—, —CH=CH—, —N=N—,

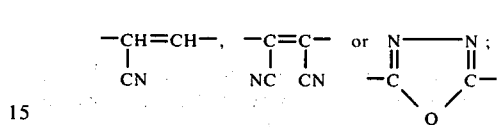

X represents a bivalent groups such as e.g. —$SO_2$—, —NH—, —N—$C_1$-$C_4$-alkyl, —$CH_2$—or —N=N—.

For A and D there should be mentioned as radicals of a coupling component of the phenol or naphthol series which is free from sulphonic acid and carboxyl groups the radicals of substituted phenols or naphthols preferably the radicals of phenol, 1- or 2-naphthol. Examples of substituents in the phenols and naphthols are especially halogen atoms as chlorine or bromine, the hydroxy group. lower alkyl groups such as the methyl, propyl and butyl groups; and lower alkoxy groups such as the methoxy, ethoxy, propoxy or butoxy groups.

Preferred dyestuffs are those of the formula

 (II)

in which A and D have the same meaning as above, and B may be substituted as mentioned above.

Dyestuffs which are particularly preferred are those of the formula

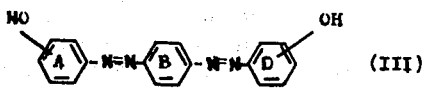 (III)

in which the radicals of the phenolic coupling components may be identical or different and may be substituted as mentioned above; and B may likewise be substituted as mentioned above.

Very high preference is given to dyestuffs which correspond to the formula

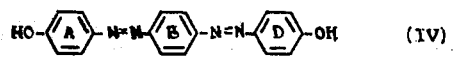 (IV)

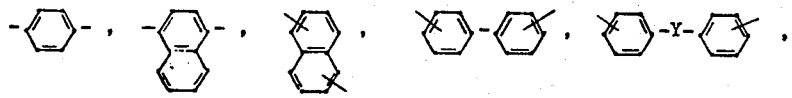

in which A and D may be identical or different and may be substituted as mentioned above; and B may likewise be substituted as mentioned above.

Other preferred dyestuffs are those of the formula

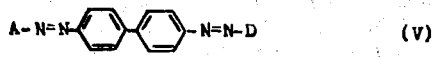

(V)

in which A and D have the same meanings as above, and the benzene rings of the biphenylyl group may be substituted in the manner indicated above for B.

Among these dyestuffs special preference is given to these of the formula

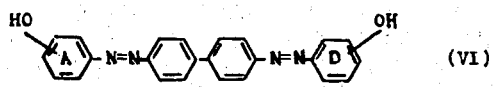

(VI)

in which A and D may be identical or different and may be substituted as mentioned above; and the benzene rings of the biphenylyl group may likewise be substituted as mentioned above for B.

Among these, very high preference is given to the dyestuffs of the formula

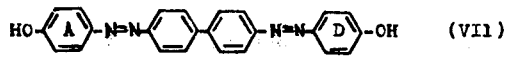

(VII)

in which A and D may be identical or different and may be substituted as mentioned above, and the benzene rings of the biphenylyl group may be substituted by one or more halogen atoms, methyl or methoxy groups.

Dyestuffs of the general formula (I) are known in large numbers. They are prepared, for example, by the tetrazotisation of suitably substituted diamines of the formula $B - (NH_2)_2$ where B means a bivalent optionally substituted group consisting of one or two benzene or one or two naphthalene nuclei and in the case where B consists of two benzene or naphthalene nuclei, these are linked to one another by a direct bond, a bivalent atom or a bivalent group, or also by a direct bond and a bivalent atom or a bivalent group, each nucleus carrying one of the two amino groups; and by coupling with 2 mol of a phenol or naphthol, coupling with 1 mol each of different phenols or naphthols, or by coupling with 1 mol of a phenol and 1 mol of a naphthol.

Dyestuffs of the formula (II) which are likewise known in large numbers can be prepared not only by tetrazotising optionally substituted phenylene-1,4-diamines and coupling with phenols or naphthols as described above, but also by diazotising an optionally substituted monoacylated phenylene1,4-diamine; coupling with a phenol or naphthol; liberating the second amino group by acidic or alkaline hydrolysis; diazotising again; and coupling with the same or with another phenol or naphthol. Furthermore, the dyestuffs of the formula (II) can also be obtained, for example, by diazotising an optionally substituted 4-nitro-aniline; coupling with an optionally substituted phenol or naphthol; reducing in the usual way the nitro group to form the amino group; diazotising again; and coupling with the same or another phenol or naphthol.

Examples or suitable diamines $B-(NH_2)_2$ are: p-phenylene-diamine, 2-chloro-p-phenylene-diamine, 4,4'-diamino-diphenyl-methane, 4,4'-diamino-diphenyl ether, benzidine, 3,3'-dichloro-benzidine, 3,3'-dimethyl-benzidine, 3,3'-dimethoxy-4,4'-diaminediphenyl, 2,5,2'-5'-tetrachlorobenzidine, 2,3,2',3'-tetramethyl-benzidine, 2,2'-dimethyl5,5'-dimethoxy-benzidine, 2,2'-dimethoxy-benzidine, 2,2'-dichloro-5,5'-dimethoxy-benzidine, 2,5,2',5'-tetramethoxybenzidine, α,p-bis-(4-amino-diphenyl)-ethane, 4,4'-diamino-diphenyl-sulphone, 4,4'-diamino-diphenyl-sulphide, 4,4'-diamino-azobenzene, 4,4'-diamino-diphenylamine, 4,4'-diaminostilbene, N,N'-bis-(4-aminophenyl)-urea, 4,4'-diaminobenzanilide, 4,4'-diamino-α-cyano-stilbene, 4,4'-diamino-α,β-dicyano-stilbene, 2,5-bis-(4'-aminophenyl)-1,3,4-oxadiazole, benzidine-sulphone, 2,7-diamino-fluorene, bis-(4'-aminonaphth-1-yl).

Aminoazo dyestuffs suitable for the preparation of diaszo dyestuffs of the formula (II) are, for example, those given below, which can be prepared by methods known from the literature, for example, either by diazotising a suitably substituted acyl-p-phenylene-diamine, coupling with a phenol and liberating the second amino group by hydrolysis of the acylamino group; or by diazotising a suitably substituted p-nitro aniline, coupling with a suitably substituted phenol, and reducing the nitro group:
4'-hydroxy-4-amino-azobenzene, 2',5'-dichloro-4'-hydroxy-4-amino-azobenzene, 4'-hydroxy-2-chloro-4-amino-azobenzene, 4'-hydroxy-2-methyl-5-methoxy-4-amino-azobenzene, 4'-hydroxy-2,5-dimethoxy-4-amino-azobenzene, 4',2-dihydroxy-4-amino-azobenzene, 5'-methyl-2'-hydroxy-4-amino-azobenzene, 4'-hydroxy-3-amino-azobenzene.

Examples of phenolic coupling components are: phenol, o-cresol, m-cresol, p-cresol, o-chloro-phenol, m-chlorophenol, p-chloro-phenol, 2,5-dichloro-phenol, o-methoxy-phenol, 2-hydroxy-diphenyl, 4-hydroxy-diphenyl, m-acetylamino-phenol, p-acetylamino-phenol, 2,5-dimethoxy-phenol, 2,4-dimethyl-phenol, 2,5-dimethyl-phenol, salicylic acid-methyl ester, salicylic acid ethyl ester, salicyclic acid amide, 2-acetylamino-4-methyl-phenol, resorcinol, m-amino-phenol, and 3-amino-4-methyl-phenol.

Examples of naphthol coupling components are: α-naphthol, β-naphthol, 6-bromo-2-naphthol, 5-chloro-1-naphthol, 5,8-dichloro-1-naphthol, 6-methoxy-2-naphthol, 7-methoxy-2-naphthol, 4-acetyl-1-naphthol, 2-hydroxy-3naphthoic acid amide, 2-hydroxy-3-naphthoic acid-N-phenylamide.

IN many cases it is proved to be an advantage when the dyebaths contained small amounts, i.e. up to 1 per cent by weight, preferably 0.5 per cent by weight of water, referred to the weight of the organic solvents.

In some cases it has also proved expedient to add non-ionic and/or ionic auxiliaries to the dyebaths. Suitable non-ionic auxiliaries are primarily the known interface-active exthoxylation and propoxylation products of fatty alcohols, alkylphenols, fatty acid amides and fatty acids as well as mixtures thereof; examples for ionic auxiliaries are anionic agents such as paraffin sulphonates or fatty alcohol sulphates; cationic agents such as N,N-dialkyl-N-(ω-fatty acidacylaminoalkyl)-aminoxides or N-alkyl-N,N-bis-(ω-fatty acidacylaminoalkyl)-aminoxides; or amphoteric agents such as surface active betaines or sulpho betaines.

The auxiliaries are used in an amount of 0.05 – 2 per cent by weight, referred to the weight of the organic solvents. Instead of being directly added to the dyebaths, the auxiliaries may also advantageously be used for pasting the dis- and trisazo dyestuffs containing at least 2 hydroxyl groups, and in this way be added to the dyebaths in the form of a dyestuff auxiliary paste.

The synthetic fibre materials to be dyed according to the invention mainly comprise fibre materials of polyesters, such as polyethylene terephthalate, polycyclohexane-dimethylene terephthalate, heterogeneous polyesters of terephthalic acid, sulphoisophthalic acid and ethylene, glycol, or copolyether ester fibres of p-oxygenzoic acid, terephthalic acid and ethylene glycol, polycarbonate, cellulose triacetate, cellulose 2 ½-acetate, polyacrylonitrile, synthetic polyamides such as hexamethylene-diamine acipate, poly-ϵ-caprolactam or ω-aminoundecanic acid, and polyurethanes. The fibre materials may be present in various stages of processing, for example, as filaments, loose material, combed material, yarn, as piece goods, such as fabrics or knitted fabrics, or as ready-made goods.

Dyeing according to the invention is preferably carried out in closed apparatus, for example, by introducing the fibre materials into the dyebath at room temperature, heating the dyebath to 60°– 170 C, and maintaining the same temperature until the bath is exhausted; this is usually the case after 10 – 60 minutes. After cooling to room temperature, the liquor is separated and the fibre materials, optionally after a short rinse with fresh organic solvent, are freed from the adhering solvent by suction or centrifuging, and subsequent drying in a warm air current. With the aid of the process according to the invention it is possible to dye synthetic fibre materials from organic solvents in a simple way with high dyestuff yields and excellent fastness properties.

The dyestuffs containing at least 2 hydroxyl groups, which are to be used according to the invention are comparatively readily soluble in the organic water-immiscible solvents. They are superior to the dyestuffs hitherto used for dyeing synthetic fibre materials from organic solvents on account of their substantially better affinity and an increased fastness to sublimation. A further advantage of the process according to the invention consists in that, at a given ratio between dyestuff and material to be dyed, the depth of colour of the resultant dyeings is largely independent of the concentration of the dyestuff in the dyebath and consequently also independent of the liquor ratio. Because of this independence of the liquor ratio, the process according to the invention can be carried out in all known dyeing devices such as winch vats, jigs etc. each of which, as is known, operates with a different liquor ratio, and it yields reproducible dyeings.

It may be pointed out that mixtures of the dyestuffs to be used according to the invention sometimes give better dyestuff yields than the individual dyestuffs.

The parts given in the following Examples are parts by weight.

EXAMPLE 1

100 Parts of a fabric of textured polyethylene terephthalate fibres are introduced, without precleaning, at room temperature into a dyebath prepared from
1 part of the disazo dyestuff 4'-hydroxy-4-amino-azobenzene → phenol and
1600 parts tetrachloroethylene.

The bath is heated with vivid circulation of the liquor to 115° C within 10 minutes and kept at the same temperature for 30 minutes. The liquor is then separated and the dye material is rinsed with fresh solvent at about 40° C for 5 minutes. After separation of the rinsing liquor, the dyed material is centrifuged and dried in an air current. A strong yellow dyeing is obtained with a high dyestuff yield. The dyeing has good fastness to light and very good fastness to washing and sublimation.

EXAMPLE 2

100 Parts of a fabric of polycyclohexane-dimethylene terephthalate fibres are introduced without precleaning at room temperature into a dyebath prepared from 1 part of the disazo dyestuff 3'-methyl-4'-hydroxy-2-chloro-4-amino-azobenzene → m-cresol and 1600 parts tetrachloroethylene.

The bath is heated with vivid circulation of the liquor to 115° C within 10 minutes and kept at the same temperature for 30 minutes. The liquor is then separated and the dyed material is rinsed with fresh solvent at about 40° C for 5 minutes. After separation of the rinsing liquor, the dyed material is centrifuged and dried in an air current. A yellow dyeing is obtained, which is characterised by very good fastness properties.

Dyeings with similar fastness properties were also obtained when the dyestuff mentioned above was replaced with the same amount of one of the following dyestuffs:

| Ex. | Diamine | Coupling component | Shade on polyester |
|---|---|---|---|
| 3 | benzidine | phenol | yellow |
| 4 | " | 2-hydroxy-diphenyl | reddish yellow |
| 5 | " | o-cresol | yellow |
| 6 | " | 2-methoxy-phenol | yellow |
| 7 | benzidine | p-naphthol | reddish orange |
| 8 | " | resorcinol | reddish yellow |
| 9 | 3,3-dichloro-benzidine | o-cresol | reddish yellow |
| 10 | " | 2-methoxy-phenol | " |
| 11 | " | 2,6-dimethyl-phenol | " |
| 12 | " | o-chloro-phenol | " |
| 13 | " | 2-hydroxy-diphenyl | yellow |
| 14 | " | p-cresol | reddish yellow |
| 15 | " | 5-chloro-2-methyl-phenol | " |
| 16 | " | 2,5-dimethyl-phenol | " |
| 17 | " | 3,5-dimethyl-phenol | " |
| 18 | " | α-naphthol | reddish orange |
| 19 | 2,2'-dichlorobenzidine | phenol | yellow |
| 20 | " | o-cresol | yellow |
| 21 | 4,4'-diamino-diphenyl-methane | phenol | " |
| 22 | α,β-bis-(4-aminophenyl)-ethane | " | " |
| 23 | 4,4'-diamino-azobenzene | " | yellowish orange |
| 24 | " | o-chloro-phenol | yellow |
| 25 | 1,5-diamino-naphthalene | phenol | " |
| 26 | 2,6-diamino-naphthalene | " | reddish yellow |
| 27 | 4,4'-diamino-diphenyl-sulphone | " | yellow |
| 28 | 4,4'-diamino-stilbene | " | " |
| 29 | " | 2-hydroxy-diphenyl | " |
| 30 | " | o-cresol | " |
| 31 | " | 2-methoxy-phenol | " |
| 32 | 3,3'-dimethoxy-benzidine | phenol | reddish yellow |
| 33 | N,N'-bis-(4-aminophenyl)-urea | p-cresol | yellow |
| 34 | 4,4'-diamino-α-cyano-stilbene | o-cresol | reddish yellow |
| 35 | 4,4'-diamino-α,β-di- | o-cresol | reddish |

-continued

| Ex. | Diamine | Coupling component | Shade on polyester |
|---|---|---|---|
| | cyano-stilbene | | yellow |
| 36 | 2,5,2',5'-tetrachloro-benzidine | phenol | yellow |
| 37 | " | o-chloro-phenol | " |
| 38 | 2,3,2',3'-tetrachloro-benzidine | o-cresol | " |
| 39 | " | phenol | " |
| 40 | 2,3,2',3'-tetramethyl-benzidine | o-chloro-phenol | " |
| 41 | 2,2'-dimethyl-5,5'-dimethoxy-benzidine | " | " |
| 42 | " | phenol | " |
| 43 | " | o-cresol | " |
| 44 | 2,2'-dimethoxy-benzidine | o-cresol | " |
| 45 | " | phenol | " |
| 46 | " | o-chloro-phenol | " |
| 47 | 2,2'-dichloro-3,3'-dimethyl- | " | " |
| 48 | " | phenol | " |
| 49 | " | o-cresol | " |
| 50 | 2,2'-dichloro-5,5'-dimethoxy-benzidine | " | " |
| 51 | " | phenol | " |
| 52 | " | o-chloro-phenol | " |
| 53 | 2,5,2',5'-tetrachloro-benzidine | o-cresol | " |
| 54 | 2,5-bis-(4'-aminophenyl)-1,3,4-oxadiazole | " | " |
| 55 | 2,5-bis-(4'-aminophenyl)-1,3,4-oxadiazole | phenol | yellow |
| 56 | " | o-chloro-phenol | " |
| 57 | benzidine-sulphone | " | " |
| 58 | " | phenol | " |
| 59 | " | o-cresol | " |
| 60 | 2,3,2',3'-tetramethyl-benzidine | 2-methyl-5-chloro-phenol | " |
| 61 | dichloro-benzidine-sulphone | 2-methyl-5-chloro-phenol | reddish yellow |
| 62 | " | phenol | " |
| 63 | dichloro-benzidine-sulphone | o-cresol | " |
| 64 | 2,5,2',5'-tetramethoxy-benzidine | phenol | yellow |
| 65 | " | o-chloro-phenol | " |
| 66 | " | 2-methyl-5-chloro-phenol | " |
| 67 | 2,7-diamino-fluorene | o-cresol | reddish yellow |
| 68 | bis-(4-aminonaphth-1-yl) | " | " |
| 69 | 3,2'-dichloro-4,4'-diamino-azobenzene | " | orange |
| 70 | 4,4'-diamino-diphenyl-ether | " | yellow |
| 71 | 4,4'-diamino-diphenyl-amine | " | " |
| 72 | 4,4'-diamino-benzanilide | " | " |
| 73 | 3,6-diamino-carbazole | " | orange |
| 74 | 3,6-diamino-N-ethyl-carbazole | " | " |
| 75 | 3,8-diamino-benzocinnoline | " | " |

| Ex. | Dyestuff | Shade on polyester |
|---|---|---|
| 76 | HO—⟨⟩—N=N—⟨⟩(Cl)—N=N—⟨⟩—OH | yellow |
| 77 | HO—⟨⟩—N=N—⟨⟩(Cl)—N=N—⟨⟩(CH₃)—OH | " |
| 78 | HO—⟨⟩(CH₃)—N=N—⟨⟩(Cl)—N=N—⟨⟩(CH₃)—OH | " |
| 79 | HO—⟨⟩(CH₃)—N=N—⟨⟩(Cl)—N=N—⟨⟩—OH | " |
| 80 | HO—⟨⟩—N=N—⟨⟩(Cl)—N=N—⟨⟩(CH₃)—OH | " |
| 81 | HO—⟨⟩(CH₃)—N=N—⟨⟩(Cl)—N=N—⟨⟩(CH₃)—OH | " |
| 82 | HO—⟨⟩(Cl)—N=N—⟨⟩(Cl)—N=N—⟨⟩—OH | " |
| 83 | HO—⟨⟩(Cl)—N=N—⟨⟩(Cl)—N=N—⟨⟩(CH₃)—OH | " |
| 84 | HO—⟨⟩—N=N—⟨⟩(Cl)—N=N—⟨⟩(Cl)—OH | " |
| 85 | HO—⟨⟩—N=N—⟨⟩(Cl)—N=N—⟨⟩(OH)—OH | " |
| 86 | HO—⟨⟩(CH₃)—N=N—⟨⟩(Cl)—N=N—⟨⟩(OH)—OH | " |
| 87 | HO—⟨⟩(OCH₃)—N=N—⟨⟩(Cl)—N=N—⟨⟩—OH | " |
| 88 | HO—⟨⟩—N=N—⟨⟩(CH₃)—N=N—⟨⟩(Cl)—OH | " |
| 89 | HO—⟨⟩—N=N—⟨⟩(CH₃)—N=N—⟨⟩—OH | " |
| 90 | HO—⟨⟩(CH₃)—N=N—⟨⟩(CH₃)—N=N—⟨⟩—OH | " |
| 91 | HO—⟨⟩—N=N—⟨⟩(CH₃)—N=N—⟨⟩(CH₃)—OH | " |

| Ex. | Dyestuff | Shade on polyester |
|---|---|---|
| 92 | HO-C6H3(Cl)-N=N-C6H3(CH3)-N=N-C6H3(CH3)-OH | " |
| 93 | HO-C6H4-N=N-C6H4-N=N-C6H3(Cl)-OH | " |
| 94 | HO-C6H3(CH3)-N=N-C6H4-N=N-C6H3(Cl)-OH | " |
| 95 | HO-C6H3(CH3)-N=N-C6H4-N=N-C6H4-OH | " |
| 96 | HO-C6H3(CH3)-N=N-C6H4-N=N-C6H3(CH3)-OH | " |
| 97 | HO-C6H3(CH3)-N=N-C6H4-N=N-C6H3(CH3)-OH | " |
| 98 | HO-C6H3(CH3)-N=N-C6H4-N=N-C6H4-OH | " |
| 99 | HO-C6H3(CH3)-N=N-C6H4-N=N-C6H3(CH3)-OH | " |
| 100 | HO-C6H3(OCH3)-N=N-C6H4-N=N-C6H4-OH | " |
| 101 | HO-C6H3(OCH3)-N=N-C6H4-N=N-C6H3(CH3)-OH | " |
| 102 | HO-C6H3(OCH3)-N=N-C6H4-N=N-C6H3(CH3)-OH | " |
| 103 | HO-C6H3(CH3)(OH)-N=N-C6H4-N=N-C6H4-OH | " |
| 104 | HO-C6H3(CH3)(OH)-N=N-C6H4-N=N-C6H3(CH3)-OH | " |
| 105 | HO-C6H3(CH3)-N=N-C6H4-N=N-C6H3(Cl)-OH | " |
| 106 | Ph-C6H3(OH)-N=N-C6H4-N=N-C6H4-OH | reddish yellow |
| 107 | HO-C6H3(CH3)-N=N-C6H3(Cl)-N=N-C6H4-OH | yellow |
| 108 | HO-C6H3(CH3)-N=N-C6H3(Cl)-N=N-C6H3(CH3)-OH | " |
| 109 | HO-C6H3(CH3)-N=N-C6H3(Cl)-N=N-C6H3(CH3)-OH | " |
| 110 | HO-C6H3(CH3)-N=N-C6H3(Cl)-N=N-C6H3(CH3)-OH | " |
| 111 | HO-C6H4-N=N-C6H4-N=N-C10H6-OH | orange |
| 112 | HO-C6H3(CH3)-N=N-C6H4-N=N-C10H6-OH | " |
| 113 | HO-C6H3(Cl)-N=N-C6H4-N=N-C10H6-OH | " |
| 114 | HO-C6H4-N=N-C6H4-N=N-C10H6-OH | " |
| 115 | HO-C6H3(CH3)(OH)-N=N-C6H4-N=N-C10H6-OH | " |

-continued

| Ex. | Dyestuff | Shade on polyester |
|---|---|---|
| 116 | 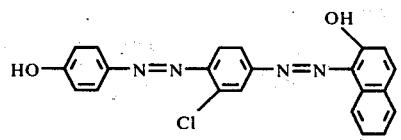 | " |
| 117 | 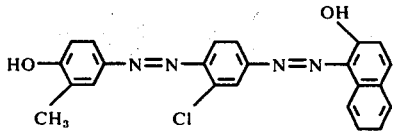 | " |
| 118 | 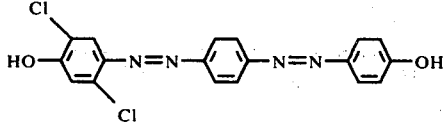 | yellow |
| 119 | 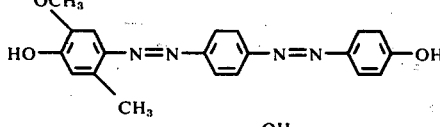 | " |
| 120 | 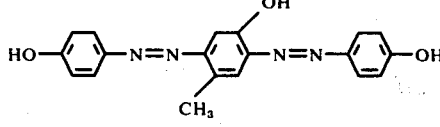 | " |
| 121 | 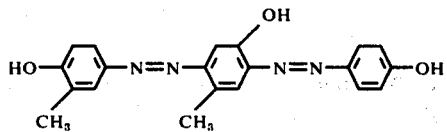 | " |
| 122 | 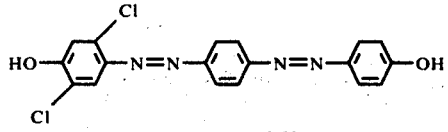 | " |
| 123 | 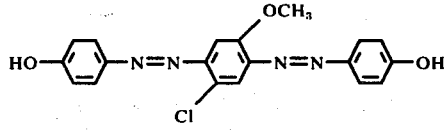 | " |
| 124 | 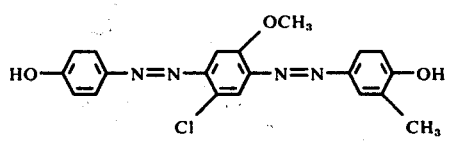 | " |
| 125 | 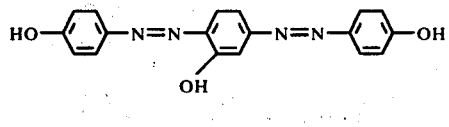 | " |
| 126 | 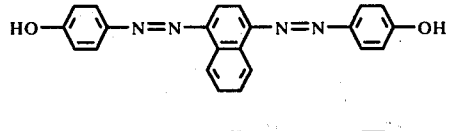 | orange |
| 127 | 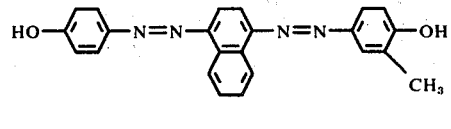 | " |
| 128 | 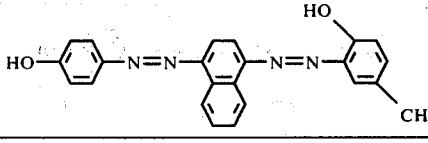 | " |

EXAMPLE 129

100 Parts of a fabric of triacetate fibres are introduced at room temperature into a dyebath prepared from 1 part of the disazo dyestuff 4'-hydroxy-4-aminoazobenzene → phenol and 1600 parts tetrachloroethylene.

The bath is heated with vivid circulation of the liquor to 110° C within 20 minutes and kept at the same temperature for 45 minutes. The liquor is then separated and the fabric rinsed with fresh tetrachloroethylene at 40° C. Ater separation of the rinsing liquor, the dyed material is freed from the adhering solvent by centrifuging and drying in an air current. A yellow dyeing of good fastness properties is obtained.

EXAMPLE 130

100 Parts of a yarn of acetate filaments are introduced at about 22° C into a dyebath prepared from 1 part of the disazo dyestuff 4'-hydroxy-4-amino-azobenzene phenol
1600 parts tetrachloroethylene
1.5 parts oleic acid ethanolamine
1.5 parts oleyl alcohol eicosaethylene glycol ether and
6 parts of water.

The bath is heated to 78° C within 20 minutes and kept at the same temperature for 45 minutes. After separation of the dye liquor and rinsing with fresh tetrachloroethylene, the dye material is freed from the adhering solvent by suction and drying in an air current. A strong yellow dyeing is obtained.

EXAMPLE 131

100 Parts of a yarn of polyacrylonitrile fibres are dyed in a bath prepared as described in Example 129. The bath is heated to 100° C within 20 minutes and kept at the same temperature for 30 minutes. After the usual washing and drying, a yellow dyeing of good fastness properties is obtained.

EXAMPLE 132

50 Parts of a fabric of polyester fibres are introduced at room temperature into a dyebath prepared from 1 part of the disazo dyestuff 4'-hydroxy-4-amino-azobenzene → phenol
1.5 parts oleic acid ethanolamide 1.5 parts oleyl alcohol eicosaethylene glycol ether
6 parts of water and
800 parts tetrachloroethylene.

The bath is heated with vivid circulation of the liquor to 120° C within 10 minutes and kept at the same temperature for 45 minutes. After separation of the dye liquor, the dyed material is rinsed with fresh solvent at 40° C and dried in an air current after removal of the rinsing liquor. A strong yellow dyeing of excellent fastness to light and sublimation is obtained.

Equally satisfactory yellow dyeings are obtained when the 800 parts tetrachloroethylene are replaced with the same amount of 1,1,2-trichloroethane, 1,1,1,2-tetrachloroethane, 1,1,2,2-tetrachloroethane, pentachloroethane, 1,2-dichloropropane, 2-chlorobutane, 1,4-dichlorobutane, perfluoro-n-hexane, 1,2,2-trichloro-trichloroethane, trifluoro-pentachloro-propane, chlorobenzene, fluorobenzene, chlorotoluene or benzotrifluoride.

EXAMPLE 133

100 Parts of a fibre yarn of poly-ε-caprolactam are introduced at room temperature into a dyebath containing 1 part of the dyestuff mentioned in Example 1 in
1600 parts tetrachloroethylene.

The bath is heated with vivid circulation of the liquor to 100° C within 20 minutes and kept at the same temperature for 40 minutes. After this period of time, the liquor is separated, the material is briefly rinsed with fresh solvent and the dyeing is dried in an air current after centrifuging. A yellow dyeing of good fastness properties is obtained.

An equally satisfactory dyeing was obtained on yarns of polyhexamethylene-diamine adipate fibres.

The strength of colour of the dyeing can be increased by adding
1 part oleic acid ethanolamide
1 part oleyl alcohol eicosaethylene glycol ether and
4 parts of water
to the dyebath.

Similar dyeings are obtained when fibres of anion-modified polyethylene terephthalate (Dacron 64) or anion-modified polyhexamethylene-diamine adipate (Nylon T 844) are used.

EXAMPLE 134

100 Parts of polycarbonate filaments are heated in a dyebath consisting of
1 part of the dyestuff of Example 1
2.5 parts oleic acid ethanolamide
2.5 parts oleyl alcohol eicosaethylene glycol ether
10 parts of water and
1600 parts tetrachloroethylene
with vivid circulation of the liquor to 115° C for 30 minutes, centrifuged, and rinsed with tetrachloroethylene at 40° C for 5 minutes. A yellow dyeing of good fastness properties is obtained.

We claim:
1. Process for dyeing synthetic fiber material comprising the steps of

1. immersing the synthetic fiber material in a dyebath consisting essentially of
   a. water-immiscible organic solvent having a boiling point of 40° C–170° C and up to 1% by weight of water based on said solvent; and
   b. a dis- or triazo dyestuff containing at least two hydroxyl groups but free from sulphonic acid and carboxyl groups having the formula

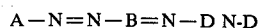

in which
A and D each is the radical of a coupling component of the phenol or naphthol series:
B is an unsubstituted or substituted radical selected from the group consisting of

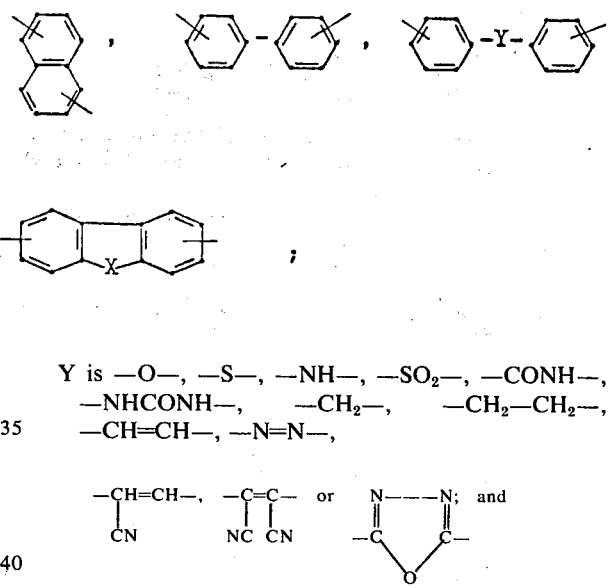

Y is —O—, —S—, —NH—, —SO$_2$—, —CONH—, —NHCONH—, —CH$_2$—, —CH$_2$—CH$_2$—, —CH=CH—, —N=N—,

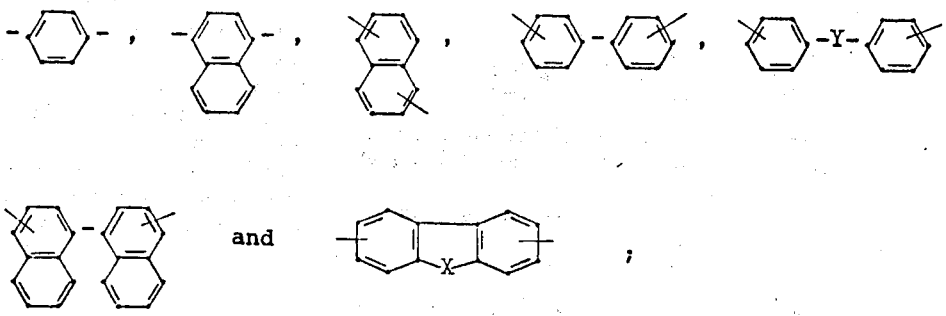

X is —SO$_2$—, —NH—, —N—C$_1$-C$_4$-alkyl, —CH$_2$— or —N=N—; and then 2. dyeing at a temperature of 60 to 170° C until the dyestuff is exhausted from the dyebath.

2. The process of claim 1 in which B stands for the optionally substituted 1,4-diphenylene residue; an optionally substituted naphthylene residue of formula

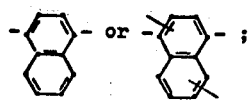

or for one of the bivalent radicals optionally substituted in their benzene or naphthalene rings of the formulae

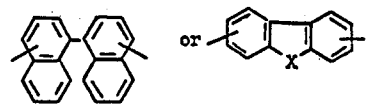

in which X and Y represent a bivalent atom or a bivalent group.

3. The process of claim 2 in which Y is —O—, —S—, —NH—, —CONH—, —NH—CO—NH—, —CH$_2$—, —C$_2$H$_4$—, —CH=CH—,

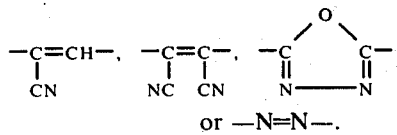

or —N=N—.

4. The process of claim 2 in which X is —SO$_2$—, —NH—, —N—(C$_1$–C$_4$-alkyl)—, —CH$_2$— or —N=N—.

5. The process of claim 1 which A and D stand for the same radical of a coupling component of the phenol or naphthol series.

6. Th process of claim 1 which said dyestuff is a dyestuff of the formula

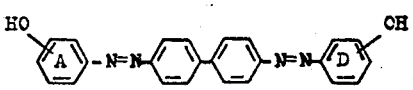

in which A and D are identical and all benzene rings are unsubstituted or substituted by halogen, C$_1$–C$_4$-alkyl groups or C$_1$–C$_4$-alkoxy groups.

7. The process of claim 1 in which said dyestuff is a disazo dyestuff of the formula

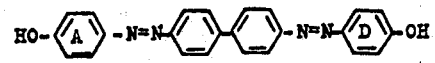

in which A and D are identical and all benzene rings are unsubstituted or substituted by halogen, C$_1$–C$_4$-alkyl groups or C$_1$–C$_4$-alkoxy groups.

8. The process of claim 1 which said dyestuff is a disazo dyestuff of the formula

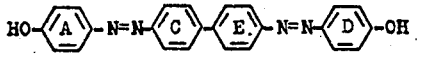

in which A and D are identical and are unsubstituted or substituted by methyl or methoxy groups; and C and E may be substituted by chlorine, bromine, methyl groups or methoxy groups.

9. The process of claim 1 in which B radicals are unsubstituted or substituted with halogen, C$_1$–C$_4$-alkyl or lower alkoxy.

10. The process of claim 1 in which said dyebath is non-aqueous.

11. The process of claim 1 in which said water-immiscible organic solvent is a halogenated aliphatic hydrocarbon having a boiling point of 40°–170° C.

* * * * *